July 28, 1959

L. I. MENDELSOHN ET AL 2,897,443

MOVING MAGNET OSCILLOGRAPH

Filed Nov. 1, 1955

Inventors:
Harold T. Faus
Lewis I. Mendelshon
by, *Richard E. Horley*
Their Attorney Inventors:
Harold T. Faus
Lewis I. Mendelshon
by. *Richard E. Horsley*
Their Attorney

United States Patent Office 2,897,443
Patented July 28, 1959

2,897,443

MOVING MAGNET OSCILLOGRAPH

Lewis I. Mendelsohn and Harold T. Faus, Lynn, Mass., assignors to General Electric Company, a corporation of New York Application November 1, 1955, Serial No. 544,210

2 Claims. (Cl. 324—97)

Our invention relates to a motor for a moving magnet oscillograph or the like and more particularly to a motor which will respond readily to high frequencies.

In a prior U.S. Patent, No. 2,102,409, to H. T. Faus, there is disclosed an electrical measuring instrument employing a movable armature consisting of a light weight permanent magnet. This magnet is permanently magnetized and is transversely polarized across the diameter thereof.

It is an object of our invention to provide an improved electrical measuring instrument of the moving magnet type which will substantially reduce the associated side torque and locking thrust acting on the rotor.

It is another object of our invention to provide an improved measuring instrument of the aforesaid type in which an improved frequency response may be obtained by substantially reducing the inertia of the rotor and increasing the magnetic retentivity thereof.

A further object of our invention is to provide an improved electrical measuring instrument of the moving magnet type in which a relatively small angular movement of the rotor suffices for the desired measurement in order that the reaction between the stator and rotor fluxes will result in a minimum side thrust on the rotor and a minimum locking torque in case the rotor should be driven off center.

A further object of our invention is to provide such an instrument having improved stability.

A still further object of our invention is to provide an improved instrument in which the single rotor element also provides the necessary restoring torque and a polished surface which acts as an oscillograph mirror.

Other features and objects of the invention will be apparent from a detailed study of the specification and attached drawings.

In carrying our invention into effect in one form thereof, a generally cylindrical diametrically magnetized rotor is positioned between salient stator poles. The direction of magnetization of the rotor is placed perpendicular to the direction of the flux path between the poles. One end of the rotor is attached to a torsion wire which is secured to a non-magnetic supporting structure attached to the stator. The other end of the rotor is attached to an element which carries a stylus which can be used to record on pressure sensitive paper. An appropriate damping mechanism is attached to the torsion wire to provide stability.

In another form of our invention, the rotor itself is secured at one end and thus provides its own restoring torque due to stresses set up in it when it is off center. The free end of the rotor may be flattened and polished to provide a mirror.

Figure 1:
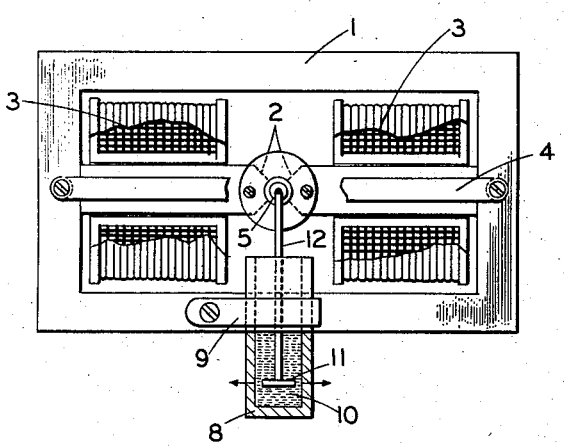
Figure 1 is a back elevation, with the supporting structure partly cut away, of one embodiment of my invention.
Figure 2:
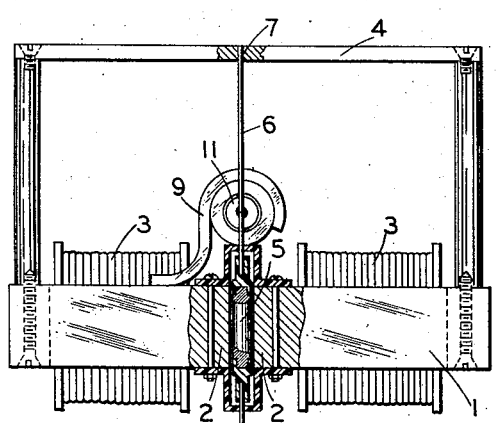
Figure 2 is a top view of the device of Figure 1.

Referring to the drawings, Figures 1 thru 5 illustrate one embodiment of our invention. In Figures 1 and 2 a three legged stator core structure 1 is shown to have a gap in the center leg forming two salient pole faces 2. Coils 3 are wound on the two portions of the center leg of the core 1. A U-shaped non-magnetic supporting structure 4 is secured to the stator core 1 and extends around behind the center leg of the core. A generally cylindrical rotor 5 lies between the two pole faces 2, being substantially parallel thereto and equidistant therefrom, due to the arcuate form of the pole faces 2. In order to bias the rotor 5 a torsion wire 6 is secured to one end thereof. The other end of the torsion wire is secured in the non-magnetic supporting structure 4 at the point 7.

To provide stability a damping mechanism receptacle 8 is suspended from the stator core by a support 9. The receptacle 8 is filled with a viscous damping fluid 10 such as silicone oil which coacts with a flange 11. The flange 11 is carried by the rod 12 which is secured to the torsion wire 6.

Figure 3:
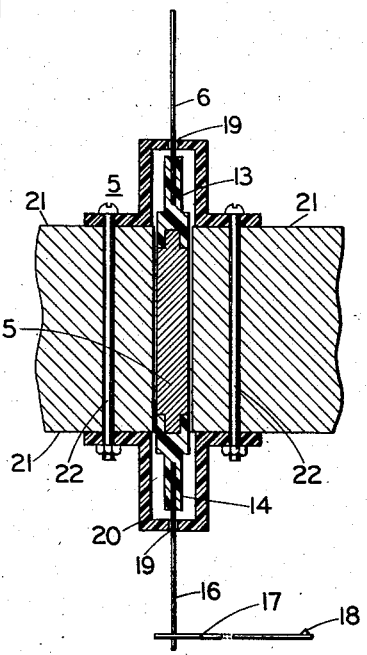
Figure 3 is an enlarged view of the rotor structure shown in Figure 2.

The specific rotor structure is best illustrated by the enlarged view of Figure 3. Here two non-magnetic end sleeves 13 and 14 are shown secured to the ends of the magnetized portion 15 of the generally cylindrical rotor 5. The torsion wire 6 is secured to the end sleeve 13 and a second wire 16 is secured to the end sleeve 14. The wire 16 carries a stylus 17 having a diamond tip 18 which may be used to record on pressure sensitive paper. The wires 6 and 16 extend through holes 19 in non-magnetic guide bearings 20. These guide bearings 20 are mounted on opposed portions 21 of the center leg of the core 1 by means of bolts 22 or other suitable fastening devices.

Figure 4:
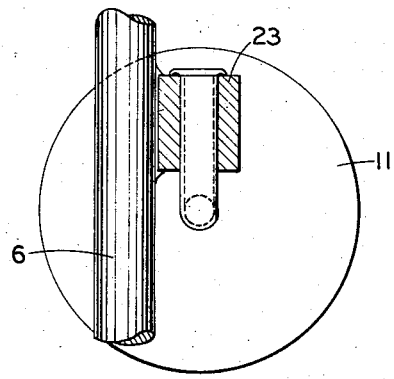
Figure 4 is an enlarged view of the movable portion of the damping mechanism as shown in Figure 1 and its supporting collar which is not illustrated in the smaller scale of Figure 1.
Figure 5:
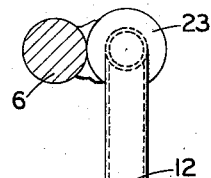
Figure 5 is an enlarged view of the damping mechanism as shown in Figure 1.
Figure 5:
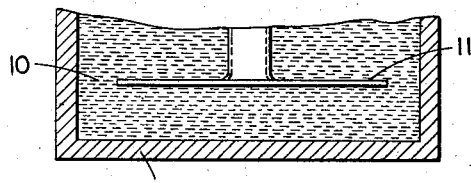

The damping mechanism mentioned above is best shown in the enlarged views of Figures 4 and 5. In Figure 4 the Phosphor bronze flange 11, also shown in Figures 1 and 2, is shown carried by the right angled rod 12. This rod is secured to the torsion wire 6 by means of a collar 23. The flange 11 coacts with the viscous damping fluid 10 carried in the receptacle 8 in order to provide stability as the flange 11 moves in the direction of the arrows indicated in Figure 1.

In order to secure the advantages of our invention the magnetic portion 15 of the generally cylindrical rotor 5 described above is made of a permanent magnet diametrically magnetized in a direction perpendicular to the plane of the paper as viewed in Figure 3. Due to the small amplitudes necessary for recording, the angle of rotation of the rotor 5 from the normal is small. Thus by our invention the flux lines of the rotor remain substantially perpendicular to the path of the flux flowing between the two stator pole faces 2. This secures the advantage of low side thrust as well as providing for a very small locking torque should the rotor somehow become off center. In order to reduce the inertia of the rotor 5 and to enhance its magnetic retentivity, it is preferably constructed of an alloy of cobalt and platinum of approximately 23.2% cobalt and 76.8% platinum by weight.

Figure 6:
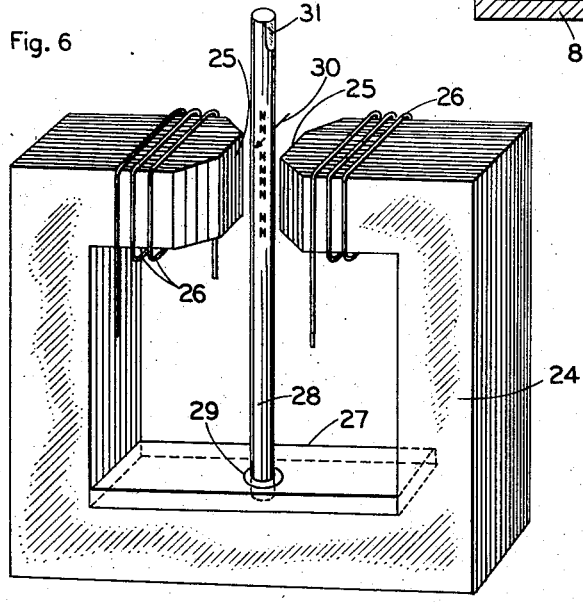
Figure 6 is an isometric view of another embodiment of my invention.

Figure 6 illustrates another embodiment of our invention. A C-shaped stator core 24 provides two salient pole faces 25 at the end thereof. Coils 26 are wound on the stator 24 adjacent the pole faces 25. A non-magnetic base plate 27 is secured to the stator 24 on the leg of the core opposite the opening defined by the pole faces 25. A diametrically magnetized generally cylindrical permanent magnet rotor 28 is secured to the base plate 27 at 29 by soldering or other suitable means. The rotor extends upward through the gap between the pole faces 25. The direction of the diametrical magnetization, as shown at 30, is perpendicular to the stator flux path across the gap. The free end of the rotor 28 is formed to provide a flattened surface 31 which may be polished in order to act as an oscillograph mirror. In this embodiment the single rotor structure acts as its own torsion wire as well as its own mirror, thus substantially reducing the inertia. The angle of rotation is here again small and the advantages of small side thrust and locking torque are also achieved because again the direction of the flux in the rotor and the flux passing between the pole faces 24 remain substantially perpendicular.

The two embodiments of our invention disclosed above using cobalt-platinum rotors and employing a relatively small angle of deflection are capable of recording relatively high frequencies. The first embodiment has a measured response capable of recording up to 1000 cycles per second with a small relative drop-off. The second embodiment has a calculated natural frequency of 20,000 cycles per second. In the first embodiment it was found that a silicone oil with a viscosity of 1,000 centistokes gave the best frequency response and that at resonance, or 600 cycles per second, the amplitude increase was only about 35 percent greater than the amplitude at 100 cycles per second. The viscosity of the damping medium was not found to be critical. For the high frequency applications requiring high torques, the torque losses due to bearing friction and the use of pressure sensitive recording tape have been found to be relatively negligible. The high calculated frequencies of the second embodiment are explainable due to the use of the mirror instead of the pressure sensitive tape as well as the general low inertia of the system. The diametrical magnetization of the rotor which is perpendicular to the path of the stator flux, and the small relative degree of rotation combine to make these devices experience relatively small side thrust and locking torque. The rotor flux at the point of the pole faces closest to the rotor is always approximately tangent to the face of the pole. This tends to minimize side thrust forces which would cause wear. The principle thus involved is analogous to the touching of a permanent magnet with a needle at the neutral section of the magnet, a resultant small force being then exerted on the needle. If the permanent magnet is touched by the needle at its poles instead, a much larger force would be exerted upon the same needle.

While we have shown particular embodiments of our invention it will be understood, of course, that we do not wish to be limited thereto since many modifications may be made and we, therefore, contemplate by the appended claims to cover any such modifications as fall within the true spirit and scope of our invention.

What we claim as new and desire to secure by Letters Patent of the United States is:

1. A galvanometer motor or the like comprising the combination of a stator structure having opposed spaced salient poles, a slender and generally cylindrical permanent magnet rotor member, means anchoring one end of said rotor member to said stator structure in a magnetically insulated relationship and positioning said rotor member between said poles, said rotor member being diametrically magnetized and disposed between said poles in a position wherein the flux from said rotor and the flux passing between said poles remain substantially perpendicular for small angular movements of said rotor member about the longitudinal axis thereof, and said anchoring means anchoring said rotor member end at a position remote from said poles such that torsion forces in said slender rotor member tend to restore said member to a neutral angular position about said longitudinal axis.

2. The device of claim 1 in which the end of said generally cylindrical permanent magnet rotor opposite said one end is free and has a polished surface formed thereon, said polished surface acting as a galvanometer mirror.

References Cited in the file of this patent

UNITED STATES PATENTS

| | | |
|---|---|---|
| 1,750,275 | Legg | Mar. 11, 1930 |
| 2,002,445 | Arey | May 21, 1935 |
| 2,411,997 | Kelly | Dec. 3, 1946 |
| 2,507,708 | Greener | May 16, 1950 |
| 2,573,998 | Thompson | Nov. 6, 1951 |
| 2,635,155 | Barr | Apr. 14, 1953 |

OTHER REFERENCES

Publication, "Ferromagnetism" by R. M. Bozorth, December 1951, page 346 relied on. (Copy in Library of Div. 3.)